(12) United States Patent
Ochi

(10) Patent No.: US 7,580,763 B2
(45) Date of Patent: Aug. 25, 2009

(54) RECORDING APPARATUS FOR RECORDING SIGNAL INCLUDING A PLURALITY OF SOUND INFORMATION

(75) Inventor: Hiroshi Ochi, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 571 days.

(21) Appl. No.: 11/254,284

(22) Filed: Oct. 20, 2005

(65) Prior Publication Data

US 2006/0088300 A1    Apr. 27, 2006

(30) Foreign Application Priority Data

Oct. 26, 2004    (JP)    ............. 2004-311330

(51) Int. Cl.
*G06F 17/00* (2006.01)
(52) U.S. Cl. ........................................ 700/94
(58) Field of Classification Search .......... 700/94; 386/83, 95, 125; 369/1–12
See application file for complete search history.

(56) References Cited

U.S. PATENT DOCUMENTS

2003/0133699 A1 *    7/2003    Ando et al. ............ 386/95
2004/0076406 A1 *    4/2004    Kikuchi et al. ............ 386/95

FOREIGN PATENT DOCUMENTS

| JP | 2003-32598 | 1/2003 |
| JP | 2003-319314 | 11/2003 |
| JP | 2004-185729 | 7/2004 |

OTHER PUBLICATIONS

Patent Abstracts of Japan, Publication No. 2003-032598, Publication Date: Jan. 31, 2003, 1 page.
Patent Abstracts of Japan, Publication No. 2003-319314, Publication Date: Nov. 7, 2003, 1 page.
Patent Abstracts of Japan, Publication No. 2004-185729, Publication Date: Jul. 2, 2004, 1 page.

* cited by examiner

*Primary Examiner*—Andrew C Flanders
(74) *Attorney, Agent, or Firm*—Osha • Liang LLP

(57) ABSTRACT

A first sound signal includes a first kind of sound signals and a second kind of sound signals. Chapter numbers are added to the first sound signal for respective switching of the kind of the sound. A second sound signal indicates a resulting sound signal after deletion of the second kind of sound signals from the first sound signal. A third sound signal indicates a sound signal in which remaining portions after deletion of the second kind of sound signals are combined with each other and chapter numbers are newly set. As described above, a chapter corresponding to a kind of a sound signal is added when the kind of the sound signal is switched, and a received signal is edited based on the chapter.

7 Claims, 5 Drawing Sheets

RECORDING APPARATUS FOR RECORDING SIGNAL INCLUDING A PLURALITY OF SOUND INFORMATION

BACKGROUND OF THE INVENTION

1. Field of the Invention

The present invention relates to a recording apparatus. More specifically, the present invention relates to a picture recording apparatus for recording a signal including a plurality of sound information.

2. Description of the Background Art

When a broadcast is recorded in a recording apparatus such as a DVD (Digital Versatile Disk) recorder, a technique is used to determine as to whether a sound in the broadcast is "monaural" or "stereo" and add a chapter mark thereto. Such technique has been conventionally used to selectively delete a commercial (hereafter abbreviated as "CM") portion in a recorded broadcast.

A conventional recording apparatus stores an index indicating a change in PID (Program IDentification) information regarding a recorded program, and reproduces the program based on the index. Since a main portion of a program and CM have different PID information, the program can be reproduced with readily skipping the CM using the index (for example, see Japanese Patent Laying-Open No. 2003-032598).

A conventional video recording and reproducing apparatus discriminates between program video images and CM video images included in a television signal and divide the video images into chapters based on pointers assigned to respective heads of the discriminated program and CM video images. During reproduction, a desired chapter can be reproduced from a top thereof by referring to the pointers, and the CM video images can be automatically skipped to reproduce only the program video images (for example, see Japanese Patent Laying-Open No. 2003-319314).

A conventional video/optical disk integrated recording and reproducing apparatus determines a kind of a sound signal read from a tape unit and generates change information of a sound when a determined kind of the sound signal is switched. With this, a troublesome operation is not required for performing dubbing recording from a video tape to an optical disk (for example, see Japanese Patent Laying-Open No. 2004-185729).

When a program desired by a user is recorded with a conventional recording apparatus, an additional program such as CM or news is sometimes recorded before the desired program. In addition, it is desirable that a user can edit out CM inserted in a recorded program or news inserted in a sports program. Such problem cannot be handled with the conventional technique for determining as to whether a sound in a recorded broadcast is "monaural" or "stereo" and adding a chapter mark thereto.

SUMMARY OF THE INVENTION

An object of the present invention is to provide a recording apparatus which enables editing of a recorded signal according to a plurality of sound information.

The present invention is a recording apparatus for recording a signal input from the outside, which recording apparatus is a DVD recorder including a signal processing portion for processing a video signal and a sound signal included in the signal, a control portion for controlling the signal processing portion, and a display device for displaying the signal processed by the signal processing portion and displaying an editing operation performed by the control portion in a thumbnail form. The control portion adds a chapter mark according to a plurality of sound information included in the sound signal, and edits the sound signal and the video signal corresponding to the sound signal based on the chapter mark. The plurality of sound information include monaural broadcast information, stereo broadcast information, main sound information and sub sound information in sound multiplex broadcasting, audio surround information, and enhanced audio surround information.

According to another aspect of the present invention, a recording apparatus for recording a signal input from the outside includes a signal processing portion for processing a video signal and a sound signal included in the signal, and a control portion for controlling the signal processing portion. The control portion adds a chapter mark according to a plurality of sound information included in the sound signal, and edits the sound signal and the video signal corresponding to the sound signal based on the chapter mark.

The plurality of sound information preferably include monaural broadcast information and stereo broadcast information.

The plurality of sound information preferably include main sound information and sub sound information in sound multiplex broadcasting.

The plurality of sound information preferably include audio surround information.

The plurality of sound information preferably include enhanced audio surround information.

Preferably, the recording apparatus further includes a display device for displaying an editing operation performed by the control portion in a thumbnail form.

The recording apparatus is preferably a DVD recorder.

According to the present invention, editing of a recorded signal according to a plurality of sound information is enabled.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
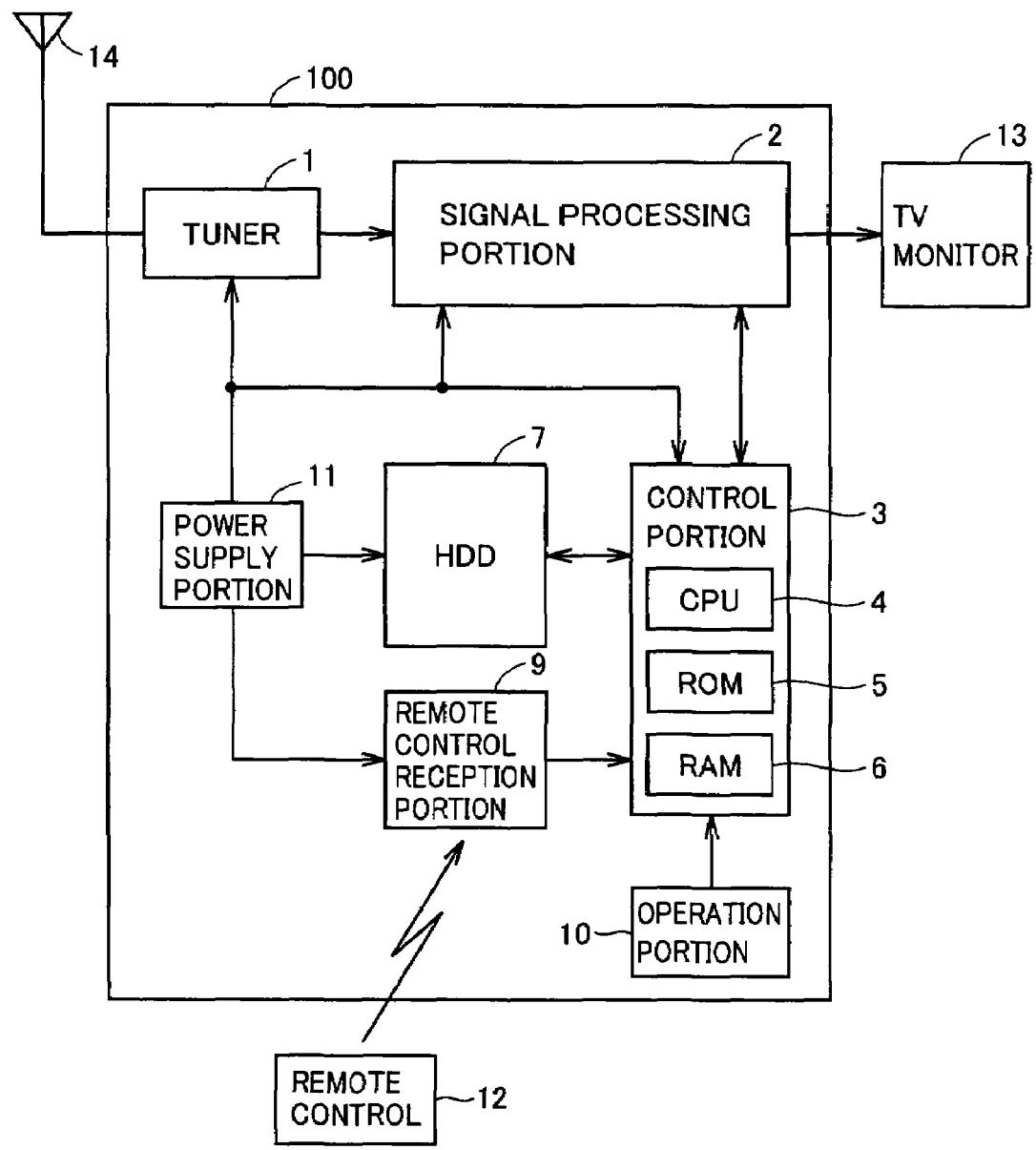
FIG. 1 is a block diagram of a schematic construction of a recording apparatus 100 according to an embodiment of the present invention.

An embodiment of the present invention will now be described in detail referring to the drawings. It is to be noted that, the same or corresponding portions in the drawings are indicated with the same characters and descriptions thereof will not be repeated.

Referring to FIG. 1, a recording apparatus 100 according to the embodiment of the present invention includes a tuner 1, a signal processing portion 2, a control portion 3, an HDD (Hard Disk Drive) 7, a remote control reception portion 9, an operation portion 10, a power supply portion 11, a television (TV) monitor 13, and an antenna 14. Control portion 3 includes a CPU (Central Processing Unit) 4, an ROM (Read Only Memory) 5 and an RAM (Random Access Memory) 6. Recording apparatus 100 can be operated with a remote control 12.

Tuner 1 retrieves a signal of a predetermined channel from signals received by antenna 14. Tuner 1 can also receive a signal from a cable or the like. Signal processing portion 2 processes a video signal and a sound signal retrieved by tuner 1. Control portion 3 controls an operation of signal processing portion 2 using CPU 4, ROM 5, RAM 6, and the like. HDD 7 reads and writes information used in control portion 3. Remote control reception portion 9 receives a control signal sent from remote control 12 and transmits information to control portion 3. Operation portion 10 operates control portion 3. Power supply portion 11 supplies power to each block of recording apparatus 100. TV monitor 13 displays a video reproduced in recording apparatus 100.

Recording apparatus 100 according to the embodiment of the present invention has a function of adding a chapter mark corresponding to a kind of the sound signal when the kind of the sound signal input to signal processing portion 2 is switched, and editing a received signal based on the chapter mark. This function is performed by control portion 3 controlling signal processing portion 2.

With this, the received signal can be freely edited according to a need of a user, and therefore skipping of CM or editing of news during a movie, for example, is enabled, which cannot be implemented by a conventional CM skip function based on discrimination between "monaural" and "stereo" sounds. Examples of kinds of sound signals are described in the following.

Terrestrial analogue sound signals include, for example, monaural broadcasting, stereo broadcasting, sound multiplex broadcasting (main sound or sub sound), audio surround, and enhanced audio surround sounds. A receiver for receiving the audio surround and enhanced audio surround sounds must include a dedicated decoder. In addition, the stereo broadcasting and sound multiplex broadcasting can be distinguished from each other by a prescribed control signal. As described above, sounds of terrestrial analogue broadcasting can be divided into five kinds when the audio surround and enhanced audio surround sounds can be received, or into at least three kinds when they are not available.

Satellite television sounds include stereo, mono 2 CH and mono 1 CH sounds for each of a television sound and an additional sound in an A mode (4 CH). In addition, a television sound 1 and a television sound 2 are included in a B mode (2 CH). As described above, satellite television sounds can be divided into at least eleven kinds, that is, nine kinds of combined sounds in the A mode and two kinds of sounds in the B mode.

An auto-chaptering function for automatically adding a chapter mark according to a kind of a sound as described above will now be described using a flow diagram.

Figure 2:
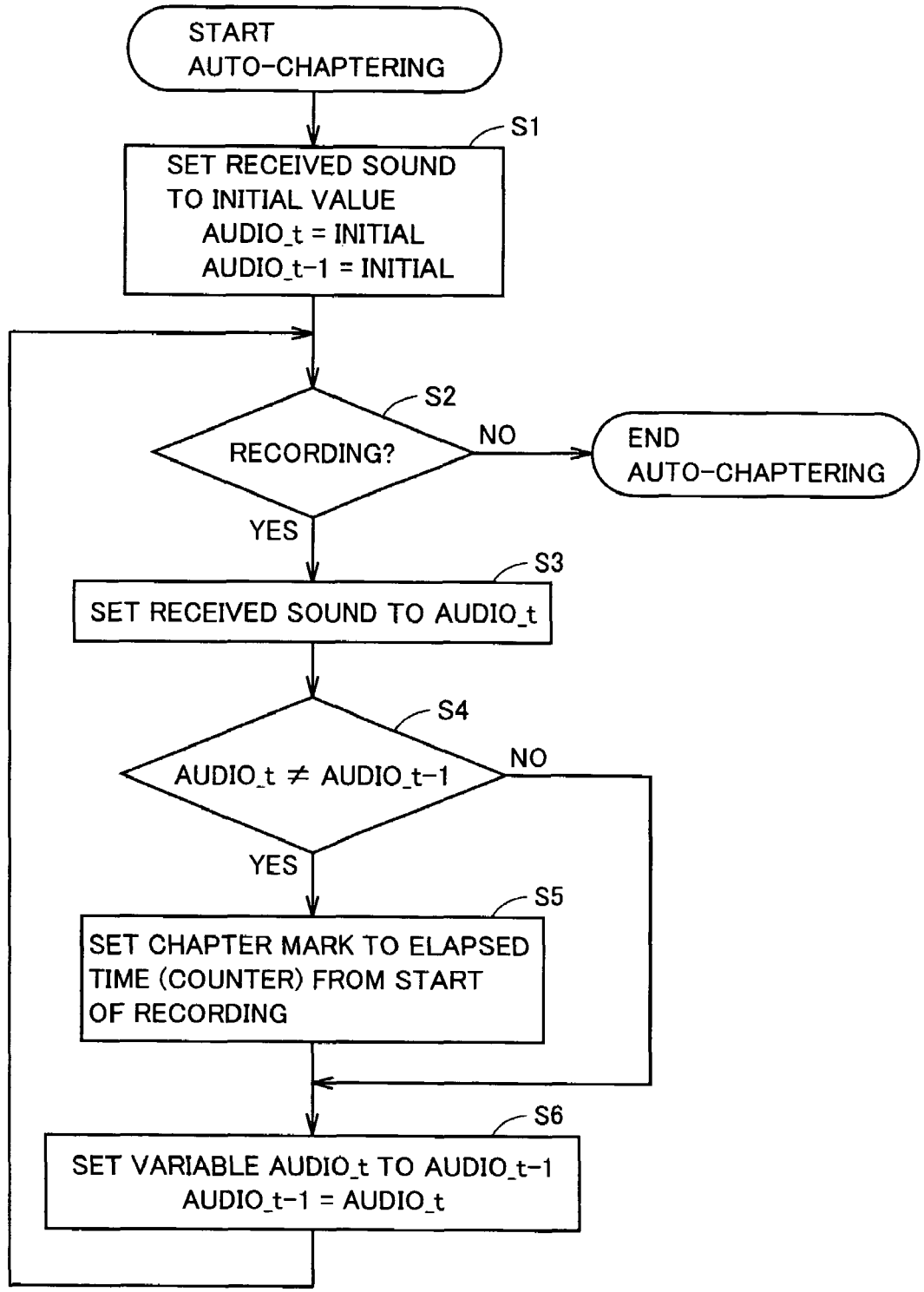
FIG. 2 is a flow diagram of an auto-chaptering function of recording apparatus 100 according to the embodiment of the present invention.

FIG. 2 is a flow diagram of the auto-chaptering function of recording apparatus 100 according to the embodiment of the present invention.

Referring to FIG. 2, in step S1, recording apparatus 100 first sets a received sound to an initial value (that is, sets to AUDIO_t=INITIAL, AUDIO_t−1=INITIAL). Then, in step S2, a determination is made as to whether recording apparatus 100 is recording a received signal from antenna 14 or the like. If recording of the received signal is currently performed, auto-chaptering processing is ended.

If recording is not performed in step S2, a current received sound is set to AUDIO_t in step S3. Thereafter, in step S4, a determination is made as to whether a variable AUDIO_t is equal to a variable AUDIO_t−1 (a received sound at one time period before AUDIO_t). If AUDIO_t≠AUDIO_t−1, a chapter mark is set in a region of the received signal in step S5, which region corresponds to an elapsed time (counter) from a start of recording.

When the chapter mark is set in step S5 or when AUDIO_t≠AUDIO_t−1 is not satisfied in step S4, then variable AUDIO_t is set to AUDIO_t−1 in step S6 (that is, AUDIO_t−1=AUDIO_t). After AUDIO_t−1=AUDIO_t is set in step S6, the processing returns to step S2. A procedure for further editing the received signal classified into respective sound signals by the auto-chaptering function will be described in the following.

Figure 3:
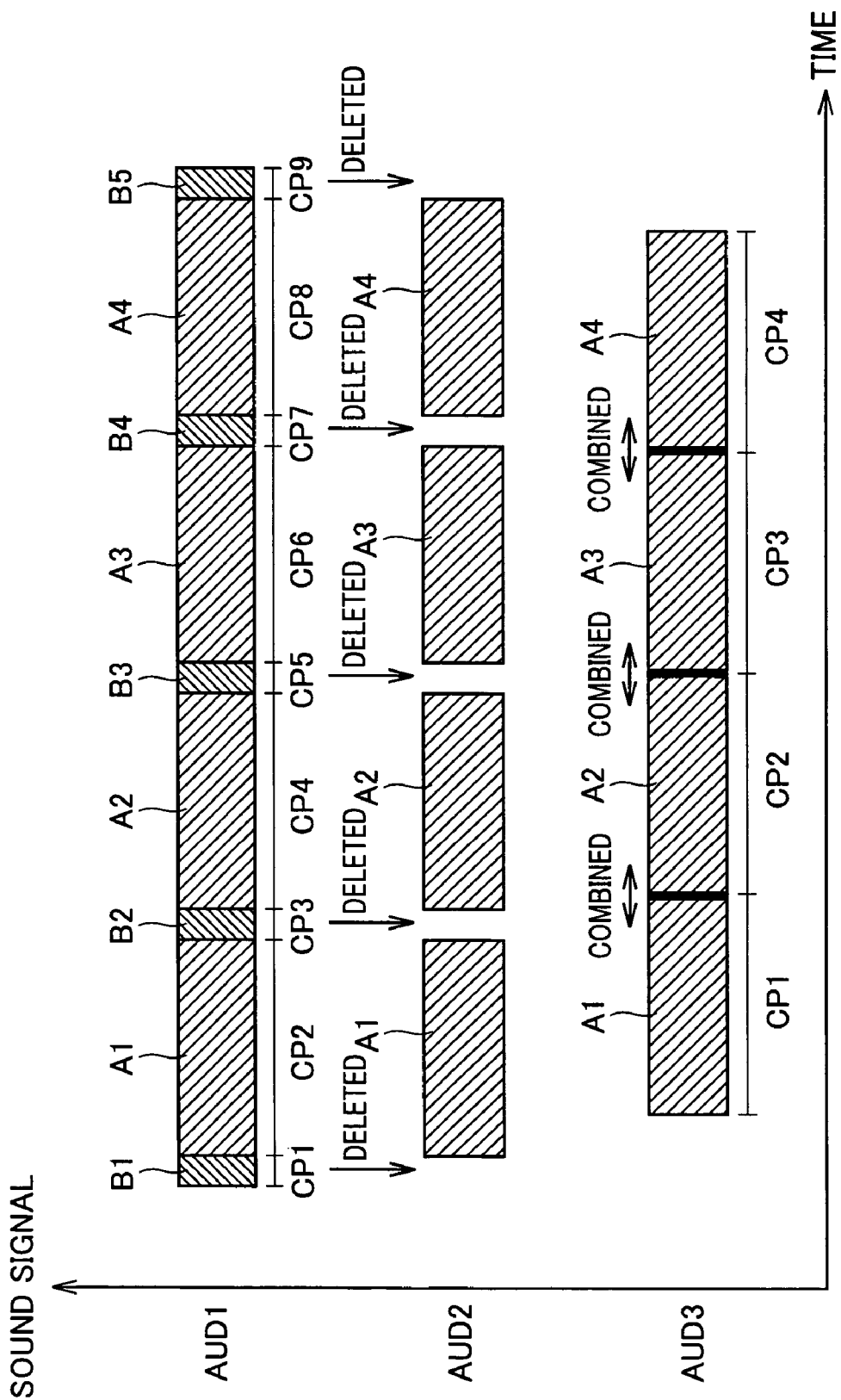
FIG. 3 is a conceptual diagram for describing a sound editing function of recording apparatus 100 according to the embodiment of the present invention.

FIG. 3 is a conceptual diagram for describing a sound editing function of recording apparatus 100 according to the embodiment of the present invention.

A sound signal AUD1 includes a first kind of sound signals A1-A4 and a second kind of sound signals B1-B5 which were divided by the auto-chaptering function in FIG. 2. Chapter numbers CP1-CP9 are added to sound signal AUD1 for respective switching of the kind of the sound.

A sound signal AUD2 indicates a resulting sound signal after deletion of the second kind of sound signals B1-B5 from sound signal AUD1.

A sound signal AUD3 indicates a sound signal in which remaining portions after deletion of the second kind of sound signals B1-B5 are combined with each other and chapter numbers CP1-CP4 are newly set.

Though an example of editing the sound signal classified into two kinds of groups is indicated in FIG. 3, the two kinds are merely indicated as an example and, generally, editing of a sound signal with classification into at least three kinds is also possible. A more specific example of the sound editing function will now be described.

Figure 4:
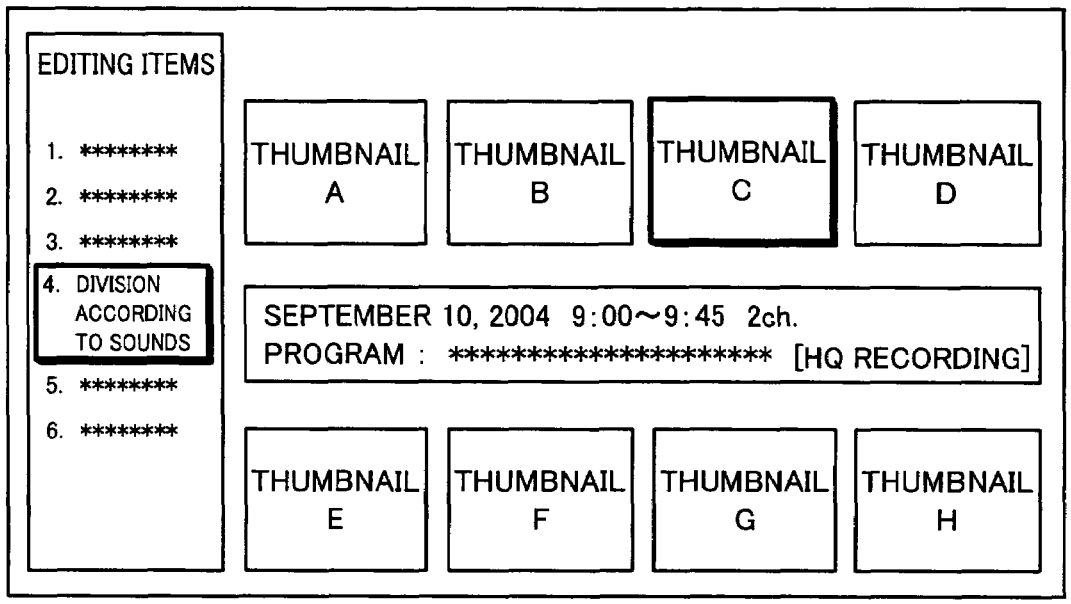
FIGS. 4 to 7 are schematic diagrams of respective first to fourth aspects of the sound editing function of recording apparatus 100 according to the embodiment of the present invention.

FIG. 4 is a schematic diagram of a first aspect of the sound editing function of recording apparatus 100 according to the embodiment of the present invention.

FIG. 4 shows a title screen on which a head image of each recorded program is displayed in a thumbnail form as each of thumbnails A-H. The screen can be displayed using TV monitor 13 shown in FIG. 1. Thumbnail C is selected in FIG. 4. Then, among editing items, "4. Division According to Sounds" is selected.

Figure 5:
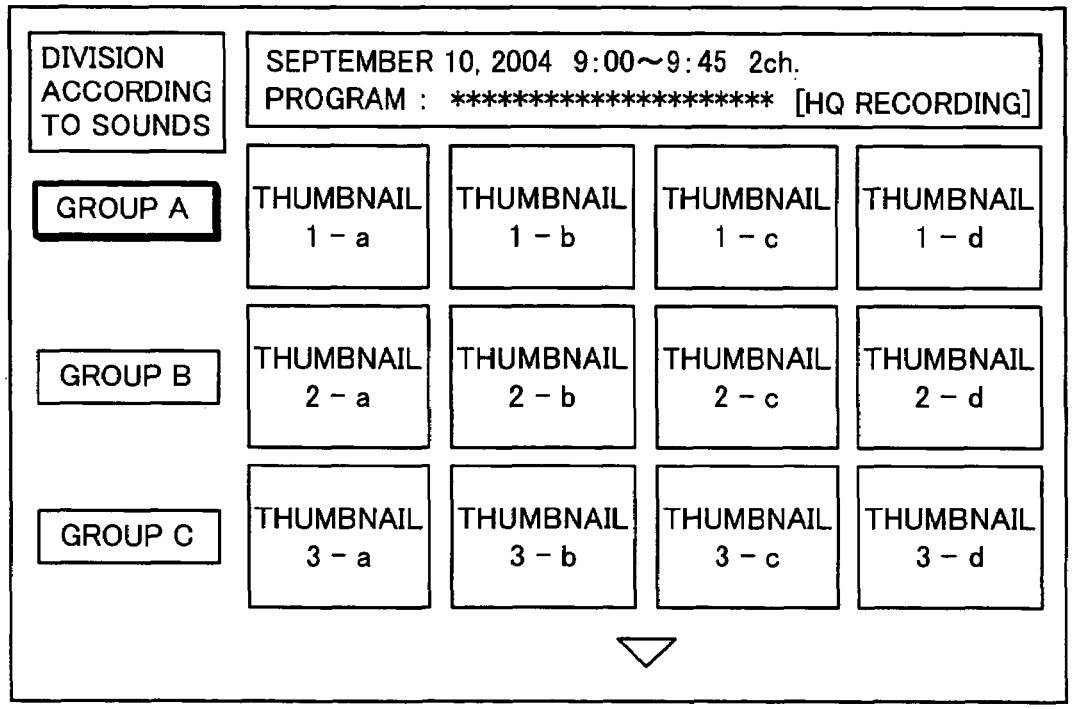

FIG. 5 is a schematic diagram of a second aspect of the sound editing function of recording apparatus 100 according to the embodiment of the present invention.

As a result of selecting the division according to sounds on the screen shown in FIG. 4, FIG. 5 shows a screen of the division according to sounds, on which thumbnail images corresponding to respective sound groups A, B, C, . . . of thumbnail C are displayed. Each sound group has thumbnails such as 1-$a$, 1-$b$, . . . corresponding to respective chapter marks (see also FIG. 2).

It is to be noted that, a group D and other groups which could not be displayed on an initial screen of the division according to sounds can be displayed by selecting an arrow icon in a lower portion of FIG. 5. On a screen displaying group D and other groups, the arrow icon points upward.

As described above, on the screen of the division according to sounds, a video is divided into groups of respective sounds at positions of the chapter marks each of which was added at a point of switching of the kind of the sound during recording. On a sound selection screen of FIG. 5, a group which is desired to be deleted can be selected among groups A-C. Group A is selected in FIG. 5.

Figure 6:
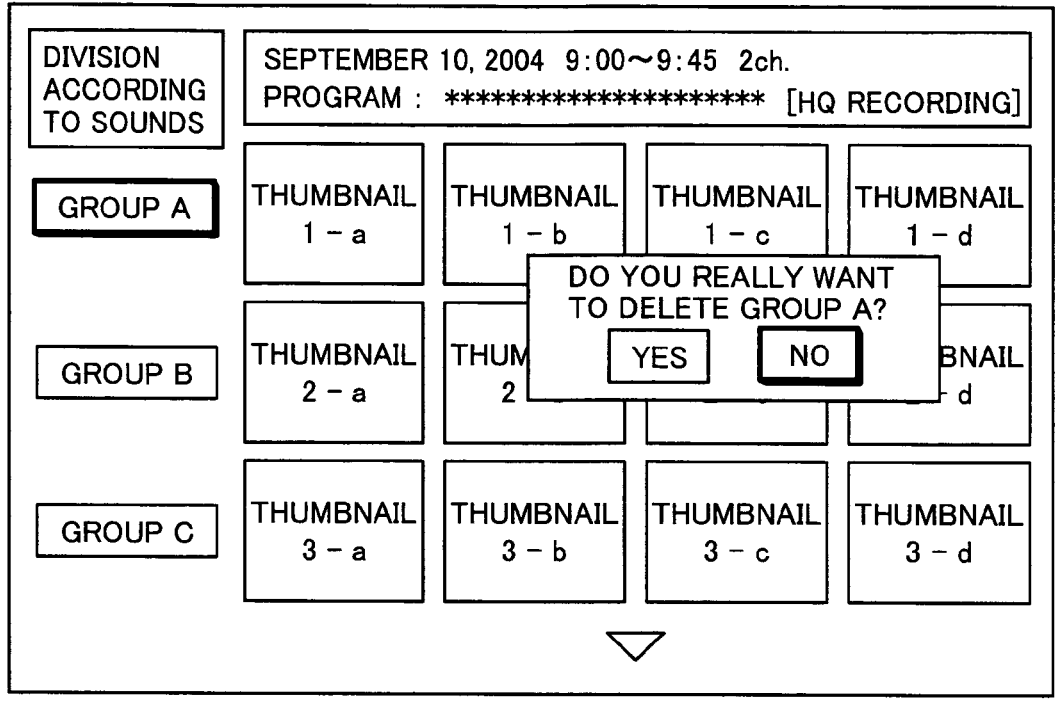

FIG. 6 is a schematic diagram of a third aspect of the sound editing function of recording apparatus 100 according to the embodiment of the present invention.

FIG. 6 shows a deletion ensuring screen for ensuring that group A is really desired to be deleted. In FIG. 6, "NO" is to be selected as an initial state. When "YES" is selected on this screen, deletion of group A is determined. If "NO" is selected on this screen, display returns to the screen of the division according to sounds shown in FIG. 5.

Figure 7:
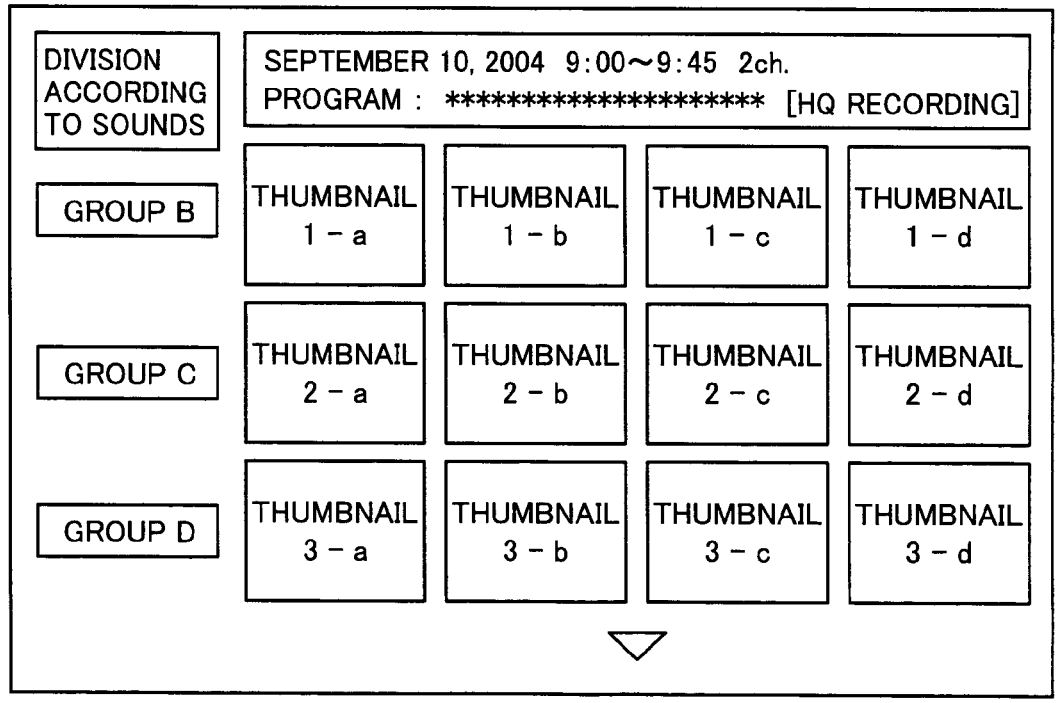

FIG. 7 is a schematic diagram of a fourth aspect of the sound editing function of recording apparatus 100 according to the embodiment of the present invention.

As a result of selecting "YES" on the screen shown in FIG. 6, FIG. 7 shows a screen after deletion on which group A was deleted and a whole thumbnails are shifted upward. By upward-shifting of the whole thumbnails, group D newly appears on the screen. An editing operation can be performed in a visually understandable way by displaying a sound editing operation in a thumbnail form using TV monitor 13, as shown in FIGS. 4-7.

As described above, according to the embodiment of the present invention, a recorded signal can be edited according to a plurality of sound information by adding a chapter mark corresponding to a kind of a sound signal when the kind of the sound signal input to the signal processing portion is switched, and editing a received signal based on the chapter mark.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A recording apparatus for recording a signal input from the outside, comprising:

a signal processing portion for processing a video signal and a sound signal included in said signal; and a control portion for controlling said signal processing portion; wherein said control portion sets a received sound to an initial value, sets the current received sound to a first variable if recording is not performed by said recording apparatus, compares said first variable with a second variable received at one time period before said first variable, adds a chapter mark in said sound signal's region corresponding to an elapsed time from a start of recording according to a plurality of sound information included in said sound signal if said first variable is not equal to said second variable, sets said first variable to said second variable if said chapter mark is added or said first variable is equal to said second variable, and edits said sound signal and said video signal corresponding to the sound signal based on said chapter mark.

2. The recording apparatus according to claim 1, wherein said plurality of sound information include monaural broadcast information and stereo broadcast information.

3. The recording apparatus according to claim 1, wherein said plurality of sound information include main sound information and sub sound information in sound multiplex broadcasting.

4. The recording apparatus according to claim 1, wherein said plurality of sound information include audio surround information.

5. The recording apparatus according to claim 1, wherein said plurality of sound information include enhanced audio surround information.

6. The recording apparatus according to claim 1, further comprising a display device for displaying an editing operation performed by said control portion in a thumbnail form.

7. The recording apparatus according to claim 1, wherein said recording apparatus is a DVD recorder.

* * * * *